United States Patent [19]  [11] 3,846,424
Hirdler et al.  [45] Nov. 5, 1974

[54] RECOVERY OF CHLORINE AND CYANURIC ACID VALUES FROM POLYCHLOROISOCYANURIC ACID AND SALTS THEREOF

[75] Inventors: Louis C. Hirdler, Lake Charles, La.; Henry W. Schiessl, Northford; David F. Doonan, both of Guilford, Conn.

[73] Assignee: Olin Corporation, New Haven, Conn.

[22] Filed: May 22, 1973

[21] Appl. No.: 362,695

[52] U.S. Cl. .............. 260/248 A, 260/248 C, 23/85
[51] Int. Cl. ............................................. C07d 55/36
[58] Field of Search .......... 260/248 A, 248 C; 23/85

[56] References Cited
UNITED STATES PATENTS
3,222,138  12/1968  Becanne et al. ................ 260/248 X
3,763,157  10/1973  Suryanarayana et al. ....... 260/248 C

*Primary Examiner*—John M. Ford
*Attorney, Agent, or Firm*—Donald F. Clements; Thomas P. O'Day

[57] ABSTRACT

A process is described for recovering chlorine and cyanuric acid values from aqueous solutions containing a chlorinated s-triazine compound selected from the group consisting of polychloroisocyanuric acids, alkali metal salts thereof and mixtures thereof. The aqueous solution of chlorinated s-triazine compound is reacted with a mineral acid to form chlorine and cyanuric acid. An inert gas is preferably passed simultaneously through the aqueous solution to remove chlorine as it forms. The chlorine-depleted aqueous slurry containing solid cyanuric acid is reacted in a neutralization step with an alkali metal compound to precipitate an alkali metal cyanurate, which is separated, for example, by filtration. The solid alkali metal cyanurate may be used in the preparation of additional polychloroisocyanuric acid or alkali metal salt thereof.

The resulting solids-free liquid, which contains some dissolved alkali metal cyanurate is contacted with an adsorbent, such as activated carbon, which adsorbs the cyanurate from the liquid, and the resulting liquid, substantially free of chlorine and cyanuric acid values, is conveyed to waste.

Alkali metal cyanurate adhering to the adsorbent is removed from the adsorbent with an alkali metal hydroxide or carbonate solution and recycled to the neutralization step.

26 Claims, 1 Drawing Figure

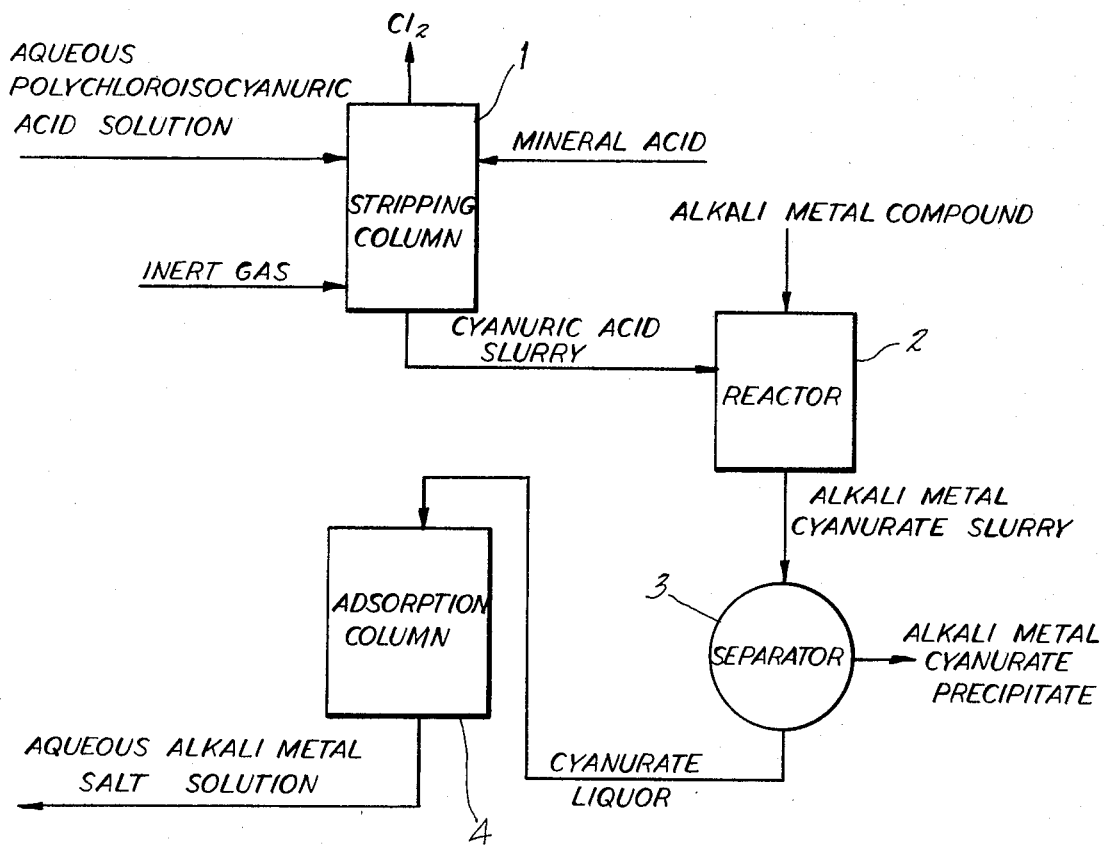

RECOVERY OF CHLORINE AND CYANURIC ACID VALUES FROM POLYCHLOROISOCYANURIC ACID AND SALTS THEREOF

This invention relates to the recovery of chlorine and cyanuric acid values from aqueous solutions of chlorinated s-triazine compounds selected from the group consisting of polychloroisocyanuric acids, alkali metal salts and mixtures thereof.

In the production of polychloroisocyanuric acids such as dichloroisocyanuric acid and trichloroisocyanuric acid, following product recovery, solutions containing varying amounts of product remain to be disposed of. In addition to containing economically valuable materials, the solutions pose a pollution problem if, for example, they are added to public waterways such as rivers and streams.

It is known to recover chlorine by the reaction of an acid with mother liquors from the production of trichloroisocyanuric acid, as shown in U.S. Pat. No. 3,222,138, issued Dec. 7, 1968 to R. L. P. Becanne et al. However, there is need for a process for the recovery of both chlorine and cyanuric acid values from aqueous solutions containing polychloroisocyanuric acids and their salts.

An object of the present invention is to provide a process for the recovery of valuable materials from aqueous solutions obtained in the production of polychloroisocyanuric acids and alkali metal salts thereof.

It is another object of the invention to provide a process for recovering chlorine and cyanuric acid compounds from aqueous solutions of polychloroisocyanuric acid and alkali metal salts thereof.

These and other objects of the invention will be apparent from the following detailed description of the invention.

It has now been discovered that the foregoing objects are accomplished in a process which comprises reacting an aqueous solution containing polychloroisocyanuric acids and their alkali metal salts with a mineral acid to liberate gaseous chlorine and form an aqueous slurry containing solid cyanuric acid. Chlorine is separated and recovered. The cyanuric acid slurry is further reacted with an alkali metal compound in a neutralization step to form a slurry of alkali metal cyanurate particles in a mother liquor containing some dissolved alkali metal cyanurates. After separation of the alkali metal cyanurate particles, the mother liquor is passed through an adsorption medium where the adsorbent retains the cyanurate present. The resulting liquid, substantially free of chlorine and cyanuric acid values is conveyed to waste. Alkali metal cyanurate is removed from the adsorption medium by leaching with an aqueous solution of an alkali metal compound, and the resulting solution is recycled to the neutralization step.

The accompanying FIGURE represents a flow diagram of the process of the present invention.

In operating the process illustrated in the FIGURE, an aqueous solution containing a polychloroisocyanuric acid is added to stripping column 1. Also added to stripping column 1 is a mineral acid which reacts with the polychloroisocyanuric acid present to evolve gaseous chlorine and form cyanuric acid. In a preferred embodiment, a gas inert to the reaction conditions is charged to stripping column 1 to aid in chlorine removal. Chlorine is removed from the upper part of stripping column 1. The resulting aqueous slurry containing solid cyanuric acid is removed from the stripping column 1 and conveyed to reactor 2. An alkali metal compound added to reactor 2 reacts with the cyanuric acid present to form a slurry of an alkali metal cyanurate in an aqueous solution of an alkali metal salt containing dissolved alkali metal cyanurate, referred to below as "cyanurate liquor". The alkali metal cyanurate slurry is transferred to separator 3 where the alkali metal cyanurate precipitate is separated from the cyanurate liquor. The solid alkali metal cyanurate is removed from separator 3 and conveyed to storage and the cyanurate liquor is conveyed to adsorption column 4 where it is contacted with an adsorbent. The alkali metal cyanurate present in the cyanurate liquor is retained by the adsorbent in adsorption column 4 and an aqueous alkali metal salt solution is removed from the bottom of adsorption column 4.

Recovery of the alkali metal cyanurate retained by the adsorbent in adsorption column 4 can be accomplished by leaching the adsorbent with an aqueous solution of an alkali metal compound (not shown). The resulting alkali metal cyanurate solution formed is removed and may be recycled to reactor 2.

In another preferred embodiment, the cyanurate liquor obtained from separator 3 is treated with a mineral acid to convert the cyanurate present to cyanuric acid. The cyanuric acid is retained by the adsorbent in adsorption column 4 and can be recovered as an alkali metal cyanurate by the addition of an aqueous solution of an alkali metal compound to the adsorbent and if desired, may be recycled to reactor 2.

More in detail, one of the reactants in the process of this invention is an aqueous solution of a chlorinated s-triazine compound such as those obtained from the production of dichloroisocyanuric acid, trichloroisocyanuric acid and their alkali metal salts. The salts can be, for example, alkali metal chloroisocyanurates, such as potassium and sodium dichloroisocyanurate. While the aqueous solution treated by the process of this invention can contain any proportion of chlorinated s-triazine compound, the aqueous solution generally contains from about 0.01 to about 30 and frequently from about 0.1 to about 5 percent by weight of the chlorinated s-triazine. Often the aqueous solution also contains an alkali metal chloride such as sodium chloride. Depending upon the source of the solution, the amount of alkali metal chloride can vary widely, and can constitute, for example, from about 0 to about 25 percent by weight and preferably from about 4 to about 15 percent by weight of the aqueous solution. High concentrations (up to about 30 percent by weight) of chlorinated s-triazine compound are present in aqueous solutions containing, for example, an alkali metal polychloroisocyanurate such as sodium dichloroisocyanurate. When the alkali metal polychloroisocyanurate is present in high concentrations, usually the solution contains little or no alkali metal chloride. Aqueous solutions containing chlorinated s-triazine compounds such as dichloro- or trichloroisocyanuric acid usually have concentrations of the chlorinated s-triazine of from about 0.01 to about 3 percent by weight. These solutions, however, frequently contain high concentrations of alkali metal chloride. In addition, the aqueous solution may contain trace amounts of cyanuric acid and other compounds which are often present as minor impurities in cyanuric acid, for example, ammelide and ammeline. The balance of the solution is generally water, which ranges, for example, from about 70 to about 95 and preferably from about 75 to about 95 percent by weight of the aqueous solution.

Aqueous solutions suitable for use in the process of the present invention include those by-product solutions obtained in the production of dichloroisocyanuric acid and/or trichloroisocyanuric acid. For example, in one type of process, cyanuric acid is reacted with sodium hydroxide to form disodium or trisodium cyanurate, which is then chlorinated by the addition of chlorine gas to produce a slurry containing dichloro- or trichloroisocyanuric acid. The slurry is filtered to recover the desired product, and a by-product solution containing varying concentrations of the di- or trichlorosiocyanuric acid remains. U.S. Pat. Nos. 2,956,056; 2,964,525; 2,969,360; 2,975,178; 3,073,823; 3,178,429; 3,189,609 and 3,534,033 exemplify this technique for producing solutions suitable for use in the process of the present invention. Other suitable techniques for producing by-product solutions suitable for use in the process of this invention are described in U.S. Pat. Nos. 3,668,204 and 3,712,891 where cyanuric acid is reacted with hypochlorous acid or a mixture of chlorine and sodium hypochlorite to produce di- and/or trichloroisocyanuric acid. Aqueous solutions containing salts of polychloroisocyanuric are also suitably used in the process of this invention and include, for example, those obtained in the processes described in U.S. Pat. Nos. 3,035,056; 3,072,654; 3,157,649; 3,270,017 and 3,501,468.

The process of this invention is particularly suitable for use in the treatment of aqueous polychloroisocyanuric acid solutions obtained from the processes disclosed in U.S. patent application Ser. No. 353,097, filed Apr. 20, 1973 by Henry W. Schiessl et al. entitled "Polychloroisocyanuric Acids Prepared From A Monoalkali Metal Cyanurate", and in U.S. patent application Ser. No. 353,098, filed Apr. 20, 1973 by Duane L. Sawhill entitled "Polychloroisocyanuric Acids Prepared From A Monoalkali Metal Cyanurate". The disclosure of these patent applications are incorporated by reference herein.

In the process of the application of Schiessl et al., a polychloroisocyanuric acid is prepared by reacting an aqueous slurry of a monoalkali metal cyanurate, such as monosodium cyanurate with hypochlorous acid and a chlorine-containing compound selected from the group consisting of chlorine and chlorine octahydrate. In this reaction the molar ratio of the chlorine-containing compound to the alkali metal cyanurate present is at least 1:1, with an excess of chlorine-containing compound preferably being used. The reaction temperature is maintained in the range from about −5° to about 45°C. and the pH of the reaction is maintained in the range at from about 3 to about 4.5. In a preferred embodiment an excess of chlorine-containing compound is used to remove gaseous by-products such as nitrogen trichloride formed during the reaction. The resulting mixture of chlorine and gaseous by-products is then further reacted with an alkali metal hydroxide to form an alkali metal hypochlorite which is reacted with chlorine to produce hypochlorous acid, which is recycled to the chlorination reaction.

In the process described in the above-mentioned application of sawhill, polychloroisocyanuric acid is prepared by reacting an aqueous slurry of a monoalkali metal cyanurate with an alkali metal hypochlorite and a chlorine-containing compound selected from the group consisting of chlorine and chlorine octahydrate. The molar ratio of chlorine-containing compound to the combined alkali metal present in both the alkali metal cyanurate and the alkali metal hypochlorite is at least 1:1. The reaction temperature is maintained in the range from about −5° to about 45°C. and the pH of the reaction is maintained in the range from about 3 to about 4.5. An excess of chlorine-containing compound is preferably employed to remove gaseous by-products formed during the reaction. The resulting mixture of chlorine and gaseous by-products is reacted with an alkali metal hydroxide to form an alkali metal hypochlorite which is returned to the chlorination reaction.

In the processes of the above-mentioned copending patent applications, the polychloroisocyanuric acid product is obtained as a slurry in an aqueous solution of an alkali metal chloride containing some dissolved polychloroisocyanuric acid. Upon separation of the solid product, the aqueous solution containing dissolved polychloroisocyanuric acid and alkali metal chloride is suitable for use in the process of the present invention.

In the process of this invention, an aqueous solution of a chlorinated s-triazine compound of the type described above is acidified to release chlorine in stripping column 1. Any acid having an ionization constant larger than than of isocyanuric acid can be employed. However, it is preferred to use a mineral acid such as hydrochloric acid, sulfuric acid, phosphoric acid or nitric acid. A sufficient amount of mineral acid is added to react with substantially all chlorine chemically combined in the chlorinated s-triazine compound present in the aqueous solution. In general, the ratio of hydrogen atoms provided by the mineral acid to chlorine atoms in the chlorinated s-triazine compound ranges from about 1:1 to about 2:1, and preferably from about 1:1 to about 1.5:1. For example, when using a monovalent acid such as hydrochloric acid, the stoichiometric amount of acid required to release all chlorine from trichloroisocyanuric acid is a molar ratio of hydrochloric acid to trichloroisocyanuric acid of 3:1 and the stoichiometric amount of hydrochloric acid required to release chlorine from dichlorocyanuric acid is a molar ratio of hydrochloric acid to dichloroisocyanuric acid of 2:1. Similarly, using a divalent acid such as sulfuric acid, the molar ratio of $H_2SO_4$ to trichloroisocyanuric acid is 1.5:1 and the molar ratio of $H_2SO_4$ to dichloroisocyanuric acid is 1:1. Equivalent proportions of trivalent acids such as phosphoric acid are employed. In order to assure complete removal of the chlorine, it is preferred to use an excess of mineral acid above the stoichiometric amount required for the specific type of chlorinated s-triazine compound present in the aqueous solution. This excess can be, for example, a molar ratio of mineral acid to the chlorinated s-triazine compound of up to about twice the stoichiometric amount required to release the chlorine therefrom. In the process of the present invention, it is preferred to use hydrochloric acid for chlorine release in stripping solumn 1, as it introduces no new anionic group into the solution being reacted which must later be discarded or recovered. In order to simplify the disclosure of the invention, it will be described hereinafter in terms of hydrochloric acid. When using hydrochloric acid to release chlorine from an aqueous solution containing trichloroisocyanuric acid the molar ratio of hydrochloric acid to trichloroisocyanuric acid is in the range from about 3:1 to about 6:1, and preferably from about 3:1 to about 4.5:1. Similarly, for reacting with an aqueous solution containing dichloroisocyanuric acid, a molar ratio of hydrochloric acid to dichloroisocyanuric acid in the range from about 2:1 to about 4:1, and preferably from about 2:1 to about 3:1, is employed.

In a preferred embodiment of the process of the present invention a stream of inert gas is fed to the bottom portion of stripping column 1 flowing countercurrently to the aqueous solution, to aid in chlorine removal. Any gas inert to the reaction conditions can be used, for example, air, nitrogen or carbon dioxide.

Any convenient temperature above 0°C. preferably in the range from about 20° to about 50°C. can be used in the chlorine removal step in stripping column 1. Higher temperatures can be used to aid in increasing the removal rate but are not required. It may also be desirable to apply a slight vacuum to the stripping column to aid in chlorine removal. The extent of chlorine removal can be determined by suitable analytical procedures, for example, the determination of the oxidation-reduction potential or measurement of the available chlorine content.

Upon removal of the chlorine from the acidified aqueous solution, the resulting chlorine-depleted aqueous slurry containing solid cyanuric acid, is removed from the lower portion of stripping column 1. This aqueous cyanuric acid slurry is conveyed to reactor 2, where it is reacted with an alkali metal compound in a neutralization step.

Alkali metal compounds suitable for reacting with cyanuric acid solutions in reactor 2 include the hydroxides and carbonates of, for example, sodium, potassium or lithium. Preferred are alkali metal hydroxides, such as sodium hydroxide. Sufficient amounts of alkali metal compound are reacted with the aqueous cyanuric acid slurry to give the resulting solution a pH of from about 7 to about 12, and preferably from about 7.5 to about 9. While retention time in reactor 2 may be any convenient period, a retention time of from about 5 to about 30 minutes is preferred. The reaction in reactor 2 can be carried out at any suitable temperature above 0°C., preferably in the range from about 20° to about 30°C. During the reaction between the alkali metal compound and the cyanuric acid slurry a slurry of an alkali metal cyanurate is formed in an aqueous solution containing an alkali metal salt. When hydrochloric acid is the mineral acid fed to stripping column 1, the alkali metal salt is alkali metal chloride, which is retained in solution throughout the process. The alkali metal cyanurate compound can be the mono- or dialkali metal cyanurate depending upon the ratio of alkali metal compound to cyanuric acid. However, it is preferred to prepare the monoalkali metal cyanurate and particularly monosodium cyanurate because it has a lower solubility than the other cyanurates.

After removing the alkali metal cyanurate slurry from reactor 2, it is conveyed to separator 3. Separator 3 can be any suitable apparatus such as a rotary filter or centrifuge. The solid alkali metal cyanurate is recovered and may be used, after further processing or storage, if desired, to prepare additional polychloroisocyanuric acid or alkali metal salts thereof. The liquid recovered from separator 3 is cyanurate liquor, an aqueous solution of alkali metal chloride containing some dissolved alkali metal cyanurate. This solution is conveyed to adsorption column 4, where it is preferably fed to the upper portion.

The cyanurate liquor contains from about 0.005 to about 1 percent by weight of alkali metal cyanurate dissolved in a solution containing an alkali metal chloride. The alkali chloride concentration may range up to about 25 percent by weight if the initial salt concentration was high. However, the alkali metal chloride preferably ranges from about 4 to about 15 percent by weight. As the cyanurate liquor is passed through adsorption column 4, the alkali metal cyanurate is adsorbed on an adsorbent contained in adsorption column 4. A neutral aqueous alkali metal chloride solution is discharged from the adsorption column, which can be safely discarded as waste without harmfully polluting natural resources.

In an additional preferred embodiment of the invention, the cyanurate liquor is acidified to a pH of from about 2 to about 6 during or prior to its addition to adsorption column 4. Any suitable acid, for example, a mineral acid selected from the group consisting of hydrochloric acid, nitric acid, phosphoric acid and sulfuric acid, can be used. Acidification converts the alkali metal cyanurate to a cyanuric acid liquor. The cyanuric acid present is retained on the adsorbent in the adsorption column 4.

Adsorbents used in adsorption column 4 include any suitable material such as activated carbon, clay, such as bentonite or molecular sieves. Activated carbon is a preferred adsorbent.

After the adsorbent has been saturated with alkali metal cyanurate, or cyanuric acid, as the case may be, cyanurate liquor is fed to a fresh adsorbent bed (not shown) and the saturated adsorbent bed is regenerated by passing an aqueous solution of an alkali metal base, for example, the hydroxide or carbonate, through the adsorption column to remove the alkali metal cyanurate or cyanuric acid from the adsorbent and to form a solution containing an alkali metal cyanurate. The aqueous solution of alkali metal base used to regenerate the adsorbent contains from about 5 to about 25 percent by weight of the alkali metal base. It may be desirable to heat the base solution above ambient temperatures before addition to the adsorption column. A portion or all of this solution may be recycled to the neutralization step in reactor 2.

The alkali metal cyanurate recovered, particularly where it is the monoalkali metal cyanurate, can be used as a starting material in the production of polychloroisocyanuric acids as described, for example, in the above-identified copending applications of Schiessl et al. and Sawhill.

Similarly, the chlorine recovered from stripping column 1 can be used directly, for example, as a starting material in the production of polychloroisocyanuric acids. In addition, the chlorine recovered from stripping column 1 can be reacted with an alkali metal compound to form an alkali metal hypochlorite which can be further reacted with, for example, chlorine to form hypochlorous acid. Either the alkali metal hypochlorite or hypochlorous acid may likewise be used as starting materials in the production of polychloroisocyanuric acids, as described in the above-identified copending applications of Schiessl et al. and Sawhill.

The following examples are presented to further illustrate the invention without any intention of being limited thereby. All parts and percentages are by weight unless otherwise specified.

EXAMPLE 1

In a process for the production of trichlorocyanuric acid, a liquor recovered after the separation of solid trichlorocyanuric acid containing 100 parts of dissolved trichloroisocyanuric acid, 840 parts of sodium chloride in 11,650 parts of water was fed to the top of a stripping column. The liquor was treated with 184 parts of 32 percent hydrochloric acid while air was passed counter-currently through the liquor to remove the chlorine (92 parts) evolved. The chlorine-containing gas was passed through a gas scrubber containing a solution of caustic soda to recover the chlorine as sodium hypochlorite.

From the stripping column a solution containing 56 parts of cyanuric acid, 12 parts HCl, 840 parts of NaCl in 11,775 parts $H_2O$ was pumped to a neutralization reactor. The pH of the mixture was raised to 8.2 by the addition of 167 parts of a 15 percent solution of NaOH. Reaction of the cyanuric acid and NaOH took place over a period of about 15 minutes and the mixture was then filtered on a rotary vacuum filter. A precipitate containing 66 parts of monosodium cyanurate in 30 parts of $H_2O$ was recovered.

The filtrate containing 6 parts of monosodium cyanurate and 859 parts of NaCl in 12,037 parts of $H_2O$ was acidified with 4.5 parts of 32 percent HCl to convert the sodium cyanurate to cyanuric acid. The filtrate was then pumped to the top of an adsorption column containing as the adsorbent activated carbon in charcoal form. The cyanuric acid was adsorbed on the column and solution of 862 parts of NaCl in 12,040 parts of water was removed from the bottom of the column.

The adsorption column was regenerated by treatment with 6 parts of a 15 percent solution of NaOH in 36 parts of $H_2O$, the cyanuric acid present was converted to yield 9 parts of trisodium cyanurate along with 2 parts of NaOH in 38 parts of $H_2O$. This solution was returned to the neutralization reactor.

EXAMPLE 2

Filtrate (5000 g.) containing 0.45 percent trichlorocyanuric acid was added to a flask, fitted with a stirrer, and 54 ml. conc. HCl was added. Chlorine evolution started immediately. Air was bubbled through the solution via a frittedglass disc until the solution was colorless and 146 ml. 2.7 N NaOH was added to raise the pH to 8.2. The precipitate formed was removed as a slurry and filtered. The filter cake dry weight was 13.2 g. and contained 97.9 percent monosodium cyanurate monohydrate. The filtrate, containing 0.064 percent monosodium cyanurate was fed to the top of a glass column containing 50 g. of activated carbon (12 × 40 mesh). The effluent from the column contained no measurable amount of cyanurate compound.

EXAMPLE 3

A 1000 lb. sample of waste stream containing 10 percent sodium dichloroisocyanurate and 8 percent NaCl was added to a mixing tank. Also added were 147 lbs. of conc. HCl. Air was bubbled through the solution for 3 hours after which time the available chlorine content of the solution was 70 ppm. The pH was then raised to 8.2 by addition of 227 lbs. of 10 percent NaOH solution. Mixing was continued for 15 minutes. The slurry was filtered and 79 lbs. (dry weight) of monosodium cyanurate monohydrate was obtained as the filter cake. The filtrate contained 0.055 percent monosodium cyanurate and its pH was lowered to 5.6 by addition of 0.44 lb. conc. HCl. The filtrate was then fed to the top of a glass column, containing 16.8 lbs. activated carbon. The effluent from the column contained no measurable amount of cyanurate compound.

What is claimed is:

1. A process for the recovery of chlorine and cyanuric acid values from an aqueous solution containing a chlorinated s-triazine compound selected from the group consisting of polychloroisocyanuric acids, alkali metal salts of polychloroisocyanuric acids and mixtures thereof which comprises reacting said aqueous solution with a mineral acid to evolve gaseous chlorine and form an aqueous slurry containing solid cyanuric acid, recovering said gaseous chlorine, reacting said aqueous slurry containing solid cyanuric acid with an alkali metal compound selected from the group consisting of hydroxide and carbonate to form an aqueous slurry containing solid alkali metal cyanurate in an aqueous solution containing dissolved alkali metal cyanurate and separating said solid alkali metal cyanurate from said slurry.

2. The process of claim 1 wherein said aqueous solution contains from about 0.01 to about 30 percent by weight of said chlorinated s-triazine compound.

3. The process of claim 1 wherein said mineral acid is selected from the group consisting of hydrochloric acid, nitric acid, phosphoric acid and sulfuric acid.

4. The process of claim 3 wherein the proportion of said mineral acid is equivalent to a ratio of hydrogen atoms in said mineral acid to chlorine atoms in said chlorinated s-triazine compound of from about 1:1 to about 2:1.

5. The process of claim 1 wherein said aqueous solution of chlorinated s-triazine compound is reacted with said mineral acid in the presence of an inert gas selected from the group consisting of air, carbon dioxide and nitrogen.

6. The process of claim 1 wherein said alkali metal salt of polychloroisocyanuric acid is sodium dichloroisocyanurate.

7. The process of claim 1 wherein said alkali metal compound is an alkali metal hydroxide.

8. The process of claim 7 wherein said alkali metal hydroxide is sodium hydroxide.

9. The process of claim 8 wherein said polychloroisocyanuric acid is trichloroisocyanuric acid.

10. The process of claim 9 wherein said mineral acid is hydrochloric acid.

11. The process of claim 10 wherein said molar ratio of hydrochloric acid to said trichloroisocyanuric acid is from about 3:1 to about 6:1.

12. The process of claim 11 wherein said molar ratio of hydrochloric acid to said trichloroisocyanuric acid is from about 3:1 to about 4.5:1.

13. The process of claim 10 wherein said aqueous slurry containing solid cyanuric acid is reacted with said sodium hydroxide until the pH of the resulting solution is from about 7 to about 10.

14. The process of claim 13 wherein said pH is from about 7.5 to about 9.

15. The process of claim 1 wherein said alkali metal cyanurate is monoalkali metal cyanurate.

16. The process of claim 15 wherein said monoalkali metal cyanurate is monosodium cyanurate.

17. The process of claim 1 wherein said aqueous solution containing dissolved alkali metal cyanurate is contacted with an adsorbent material on which said alkali metal cyanurate is adsorbed, said adsorbent being selected from the group consisting of activated carbon and clay.

18. The process of claim 17 wherein said adsorbed cyanurate is removed from said adsorbent by contacting a solution of an alkali metal hydroxide with said adsorbent.

19. The process of claim 18 wherein said adsorbent material is activated carbon.

20. The process of claim 1 wherein said aqueous solution containing dissolved alkali metal cyanurate is reacted with a mineral acid to form a cyanuric acid liquor, and said cyanuric acid liquor is contacted with an adsorbent selected from the group consisting of activated carbon and clay, whereby said cyanuric acid is adsorbed upon said adsorbent.

21. The process of claim 20 wherein said adsorbed cyanuric acid is removed from said adsorbent by contacting a solution of an alkali metal hydroxide with said adsorbent.

22. The process of claim 3 wherein
a. said aqueous slurry containing cyanuric acid is reacted with said alkali metal compound until the pH of said slurry is from about 7 to about 10, to form said slurry of solid alkali metal cyanurate in a solution containing dissolved alkali metal cyanurate,
b. separating said solid alkali metal cyanurate and reacting said aqueous solution containing dissolved alkali metal cyanurate with hydrochloric acid to form a second aqueous slurry of cyanuric acid,
c. contacting said second aqueous slurry of cyanuric acid with an adsorbent material selected from the group consisting of activated carbon and clay, whereby said cyanuric acid is adsorbed, on said adsorbent from said second slurry,
d. reacting said adsorbed cyanuric acid with a solution of sodium hydroxide to form an alkali metal cyanurate solution and recycling said alkali metal cyanurate solution for admixing with said aqueous solution of chlorinated s-triazine.

23. The process of claim 22 wherein said alkali metal cyanurate is monosodium cyanurate.

24. The process of claim 23 wherein said mineral acid is hydrochloric acid.

25. The process of claim 24 wherein said polychloroisocyanuric acid is trichloroisocyanuric acid.

26. The process of claim 25 wherein said adsorbent is activated carbon.

* * * * *